US007599838B2

(12) United States Patent
Gong et al.

(10) Patent No.: US 7,599,838 B2

(45) Date of Patent: Oct. 6, 2009

(54) SPEECH ANIMATION WITH BEHAVIORAL CONTEXTS FOR APPLICATION SCENARIOS

(75) Inventors: Li Gong, San Francisco, CA (US); Townsend Duong, San Jose, CA (US); Andrew Yinger, Ann Arbor, MI (US)

(73) Assignee: SAP Aktiengesellschaft, Walldorf ( * ) Notice: Subject to any disclaimer, the term of this patent is extended or adjusted under 35 U.S.C. 154(b) by 966 days.

(21) Appl. No.: 10/932,411

(22) Filed: Sep. 1, 2004

(65) Prior Publication Data

US 2006/0047520 A1 Mar. 2, 2006

(51) Int. Cl.
*G10L 13/00* (2006.01)
*G10L 13/08* (2006.01)
*G06T 13/00* (2006.01)

(52) U.S. Cl. .................... 704/258; 704/266; 704/270.1; 345/473

(58) Field of Classification Search ................. 704/258, 704/260, 261, 266, 269, 270, 270.1, 276, 704/275; 345/473
See application file for complete search history.

(56) References Cited

U.S. PATENT DOCUMENTS

| | | | | |
|---|---|---|---|---|
| 5,040,214 | A | 8/1991 | Grossberg et al. | |
| 5,689,618 | A | 11/1997 | Gasper et al. | |
| 5,966,691 | A * | 10/1999 | Kibre et al. | 704/260 |
| 5,983,190 | A | 11/1999 | Trower, II et al. | |
| 5,987,415 | A | 11/1999 | Breese et al. | |
| 6,151,571 | A | 11/2000 | Pertrushin | |
| 6,157,935 | A | 12/2000 | Tran et al. | |
| 6,385,583 | B1 * | 5/2002 | Ladd et al. | 704/270 |
| 6,453,290 | B1 * | 9/2002 | Jochumson | 704/231 |
| 6,636,219 | B2 * | 10/2003 | Merrick et al. | 345/473 |
| 6,772,122 | B2 * | 8/2004 | Jowitt et al. | 704/270 |
| 6,795,808 | B1 * | 9/2004 | Strubbe et al. | 704/275 |
| 6,874,127 | B2 | 3/2005 | Newell et al. | |
| 7,058,626 | B1 * | 6/2006 | Pan et al. | 707/4 |
| 7,103,548 | B2 * | 9/2006 | Squibbs et al. | 704/260 |
| 7,203,642 | B2 * | 4/2007 | Ishii et al. | 704/231 |
| 7,203,648 | B1 * | 4/2007 | Ostermann et al. | 704/260 |
| 7,260,539 | B2 * | 8/2007 | Cosatto et al. | 704/275 |
| 7,398,209 | B2 * | 7/2008 | Kennewick et al. | 704/255 |

(Continued)

OTHER PUBLICATIONS

Bonamico et al., "Virtual Talking Heads for Tele-Education Applications" *International Conference Advances in Infrastructure for Electronic Business, Science, and Education on the Internet*, Aug. 6, 2001, 8 pages.

(Continued)

*Primary Examiner*—Martin Lerner
(74) *Attorney, Agent, or Firm*—Fish & Richardson P.C.

(57) ABSTRACT

Methods and systems, including computer program products, for speech animation. The system includes a speech animation server and one or more speech animation clients. The speech animation server generates speech animation content that drives the expressions and behaviors of talking agents displayed by the speech animation clients. The data used by the server includes one or more references to behavioral contexts. A behavioral context corresponds to a particular application scenario and includes a set of expressions that are appropriate to the particular application scenario. A behavioral context can also be defined as a combination of two or more other behavioral contexts. The server automatically incorporates the expressions of a particular behavioral context into any data that references the particular behavioral context.

20 Claims, 9 Drawing Sheets

U.S. PATENT DOCUMENTS

| | | | | |
|---|---|---|---|---|
| 7,472,065 | B2 * | 12/2008 | Aaron et al. | 704/258 |
| 7,478,047 | B2 * | 1/2009 | Loyall et al. | 704/258 |
| 7,502,738 | B2 * | 3/2009 | Kennewick et al. | 704/257 |
| 7,519,534 | B2 * | 4/2009 | Maddux et al. | 704/255 |
| 7,529,674 | B2 * | 5/2009 | Gong et al. | 704/270 |
| 2002/0110248 | A1 * | 8/2002 | Kovales et al. | 381/56 |
| 2002/0128838 | A1 | 9/2002 | Veprek | |
| 2003/0028380 | A1 * | 2/2003 | Freeland et al. | 704/260 |
| 2003/0149569 | A1 * | 8/2003 | Jowitt et al. | 704/275 |
| 2004/0075677 | A1 * | 4/2004 | Loyall et al. | 345/706 |
| 2005/0043955 | A1 * | 2/2005 | Gong et al. | 704/276 |

OTHER PUBLICATIONS

Ostermann et al., "Talking Heads and Synthetic Speech: An Architecture for Supporting Electronic Commerce", *Multimedia and Expo. ICME*, 2000, IEEE International Conference, New York, NY, USA, Jul. 30, 2000, pp. 71-74.

Ostermann et al., "Real-Time Streaming for the Animation of Talking Faces in Multiuser Environments", *IEEE International Symposium on Circuits and Systems Proceedings IEEE*, Piscataway, NJ, USA, 2002, pp. I437-I440.

Pandzic "An XML Based Interactive Multimedia News System" *Department of Telecommunications Faculty of Electrical Engineering and Computing Zagreb University*, Croatia, Jun. 22, 2003, 5 pages.

Pandzic "Life on the Web" *Software Focus Journal*, 2001, vol. 2, No. 2, pp. 52-59.

Cacioppo, J.T. et al.; "Psychophysiology of Emotion Across the Life Span"; Annual Review of Gerontology and Geriatrics, vol. 17, pp. 27-74; (1997).

Cacioppo, J.T. et al; "The Psychophysiology of Emotion"; Handbook of Emotions, 2nd Ed.; Chapter 11; pp. 173-191 (2000).

Murray, I. et al; "Toward the Simulation of Emotion in Synthetic speech: A review of the Literature on Human Vocal Emotion"; The Journal of the Acoustical Society of America, vol. 93, No. 2; pp. 1097-1108, (Feb. 1993).

Nass, C. et al., "Speech Interfaces from an Evolutionary Perspective"; Communications of the ACM, vol. 43, No. 9; pp. 36-43; (September 200).

Pulse Entertainment, Inc., "User Guide: Pulse Audio Manager, Version 3.1," Oct. 21, 2002, pp. 1-44.

* cited by examiner

```
<fata-data>                                   610
        <talking-head-data name*=[alias]
              emotion=[emotion]
              expression=[expression]
              look=[look direction]
              voice*=[voice name]>    620
              <speech-files type*=[set|pool]>        630
                 <speech-data type*=[talking-head data|textFile|pwcFile|static|fataData]
                         emotion=[emotion]
                         expression=[expression]
                         look=[look direction]
                         voice=[voice name]
                         value*=[alias|path|text|value]/>
</fata-data>
```

FIG. 6A

```
<fata-data>
        <talking-head-data name="RES-completely-random"
              emotion="happy"
              voice="Sam">
              <speech-files type="pool">                                       640
                 <speech-data type="talking-head-data" value="RES-canned-greeting"/>      650
                 <speech-data type="static" value="Hello, how random this is." emotion="neutral"/>
                 <speech-data type="textFile" value="/dir/someText.txt" voice="Tom"/>  660
                 <speech-data type="pwcFile" value="/dir/pwc/hello.pwc" look="up"/>  670
                 <speech-data type="fataData" value="Username" expression="nod"/>
              </speech-files>                                                    680
</fata-data>
```

FIG. 6B

710 720

There is nothing better than a <fataData value="ProductName"/>for a gift.

FIG. 7A

```
<speech-files type="set">
    <speech-data type="static" value="There is nothing better than a"/>
    <speech-data type="fataData" value="ProductName"/>
    <speech-data type="static" value="for a gift."/>
</speech-files>
```

FIG. 7B

There is nothing better than a Grand Doohickey for a gift.

FIG. 7C

900

```
<fata-data>
    <talking-head-data name="RES-canned-greeting" behavioralcontext="greeting"
            emotion="happy" voice="Sam">
        <speech-files type="set">
            <speech-data type="pwcFile" value="pwc/greeting.pwc" />
        </speech-files>
    </talking-head-data>

    <talking-head-data name="RES-super-greeting" behavioralcontext="greeting"
            emotion="happy" voice="Mary">
        <speech-files type="set">
            <speech-data type="textFile" value="../webapps/fata/text/intro.txt"/>
            <speech-data type="static" value="Well, that's enough about me."/>
            <speech-data type="static" value="Oh, and my name is-" />
            <speech-data type="fataData" value="Username" />
            <speech-data type="pwcFile" value="pwc/greeting.pwc" />
            <speech-data type="static" value="That -- is it." />
            <speech-data type="static" value="Ok, goodbye." />
        </speech-files>
    </talking-head-data>

    <!-- Definition of behavioral context data-->
        <behavioral-context-data name="greeting">
            <expression tag="nod" trigger="start" duration="500ms" />
            <expression tag="smile" trigger="end" duration="750ms" />
        </behavioral-context-data>
</fata-data>
```

910, 920, 930, 940, 950

FIG. 9

```
< fata-data>
...

      <behavioral-context-data name="upcoming-purchase">
                  <expression tag="smile"   trigger="start" duration="500ms"/>
1040              <expression tag="prosodic-change"   trigger="start" duration="all"
          attributes="volume:+10%;pitch:+15"/>
      <behavioral-context-data>

      <behavioral-context-data name="return-customer">
                  <expression tag="look" trigger="start" duration="all"
1050      attributes="direction:forward"/>
                  <expression tag="wink"   trigger="end"   duration="250ms"/>
      <behavioral-context-data>

      <behavioral-context-data name="upcoming-return-purchase">
1010              <behavioral-context-ref id="upcoming-purchase"/>   <- 1020
                  <behavioral-context-ref id="return-customer"/>   <- 1030
      <behavioral-context-data>
...

</fata-data>
```

FIG. 10

SPEECH ANIMATION WITH BEHAVIORAL CONTEXTS FOR APPLICATION SCENARIOS

BACKGROUND

The present disclosure relates to data processing by digital computer, and more particularly to speech animation. Speech animation refers to speech that is synchronized with facial expressions.

Existing speech animation systems require user intervention to feed input text into the system. Typically, users must either manually enter the text or manually load a text file into the system. Typically, users must create a separate input text for each instance of speech animation that the system outputs.

SUMMARY OF THE INVENTION

The present invention provides methods and systems, including computer program products, implementing techniques for speech animation.

In general, in one aspect, the techniques include receiving a first request from a client application for first speech animation. The first request identifies data to be used to generate the first speech animation. The first speech animation is speech synchronized with facial expressions. The identified data includes a reference to a behavioral context. The behavioral context corresponds to a particular application scenario and includes a set of expressions that are appropriate to the particular application scenario. The techniques further include retrieving the data and the set of expressions in the behavioral context, generating the first speech animation using the retrieved data and the set of expressions in the behavioral context, and sending a response identifying the generated first speech animation to the client application.

The techniques can be implemented to provide one or more of the following features:

Retrieving the data includes retrieving the data in real time.

The data specifies text to be used to generate the first speech animation. The text includes variable elements. The data specifies a voice to be used to generate the first speech animation. The data specifies a pool of synonyms; and generating the first speech animation includes selecting a synonym from the pool of synonyms.

The first request further identifies context information taken from a live session of the client application, and generating the first speech animation includes incorporating the context information into the generated first speech animation.

The context information includes information about a user of the client application. The client application is a web application and the first request is an HTTP request.

The techniques further include receiving a second request from the client application for a second speech animation, the second request identifying data to be used to generate the second speech animation, wherein the data identified in the second request is different from the data identified in the first request, but contains a reference to the same behavioral context referenced by the data identified in the first request; and generating the second speech animation using the identified data and the same set of expressions used to generate the first speech animation.

In general, in another aspect, the systems include a speech animation server and a client application in communication with the speech animation server.

The client application is operable to perform the following operations: sending a request for speech animation to the speech animation server, the request identifying data to be used to generate the speech animation, the speech animation being speech synchronized with facial expressions; receiving a response from the speech animation engine, the response identifying the generated speech animation; and using the generated speech animation to animate a talking agent displayed on a user interface of the client application.

The speech animation server is operable to perform the following operations: receiving the request for speech animation from the client application; retrieving the data identified in the request, wherein the retrieved data includes a reference to a behavioral context, the behavioral context corresponding to a particular application scenario and including a set of expressions that are appropriate to the particular application scenario; generating the speech animation using the retrieved data and further using the set of expressions defined in the behavioral context; and sending the response identifying the generated speech animation to the client application.

The system can be implemented to include one or more of the following features:

Retrieving the data includes retrieving the data in real time.

The data specifies text to be used to generate the speech animation. The text includes variable elements. The data specifies a voice to be used to generate the speech animation. The data specifies a pool of synonyms; and generating the speech animation includes selecting a synonym from the pool of synonyms.

The request further identifies context information taken from a live session of the client application; and generating the speech animation includes incorporating the context information into the generated speech animation.

The context information includes information about a user of the client application.

The client application is a web application; and the request is an HTTP request.

The invention can be implemented to realize one or more of the following advantages:

The raw data used to generate the speech animation content is retrieved automatically by the system. Manual feeding of text into the system is no longer required. This makes the system more scalable.

The raw data is retrieved in real time, rather than in advance. This ensures that the most up-to-date version of the data is retrieved.

The raw data includes dynamic or variable elements. The variable elements are adapted to suit a particular client application or user of the client application. This enables the speech animation content to be more interesting and personalized and makes the speech animation client appear more socially intelligent to a user of the client application. This also enables the system to be more scalable because the number of different speech utterances in the speech animation output is not limited by the input text. The variable elements enable the system to generate a potentially infinite number of variations to the input text.

It is easy for client applications to integrate or interface with the system. The system provides a single point of entry for all client requests. Also, the system provides a set of custom scripting tags that developers of client applications can incorporate into the user interface code for the client applications. These tags expand into code that invokes the system.

The use of behavioral contexts reduces redundancy in the raw data. This improves the efficiency, automaticity, and scalability of the system.

The use of behavioral contexts and adaptive content enables speech animation clients to exhibit expressions and behaviors which are appropriate to particular application scenarios and enables the speech animation system to provide this functionality to its clients with minimal or no manual coding.

One implementation provides all of the above advantages.

The details of one or more implementations are set forth in the accompanying drawings and the description below. Further features, aspects, and advantages will become apparent from the description, the drawings, and the claims.

BRIEF DESCRIPTION OF THE DRAWINGS

FIG. 6A is an example of an XML schema used by the system.

FIG. 6B is an example of XML data used by the system.

FIG. 7A is an example of a dynamic text template that uses custom markup tags.

FIG. 7B is an example of a dynamic text template that uses speech sets.

FIG. 7C is an example of static text produced from a dynamic text template.

FIG. 9 is an example of XML data that uses behavioral contexts.

FIG. 10 is an example of XML data that uses composite behavioral contexts.

Like reference numbers and designations in the various drawings indicate like elements.

DETAILED DESCRIPTION

Figure 1:
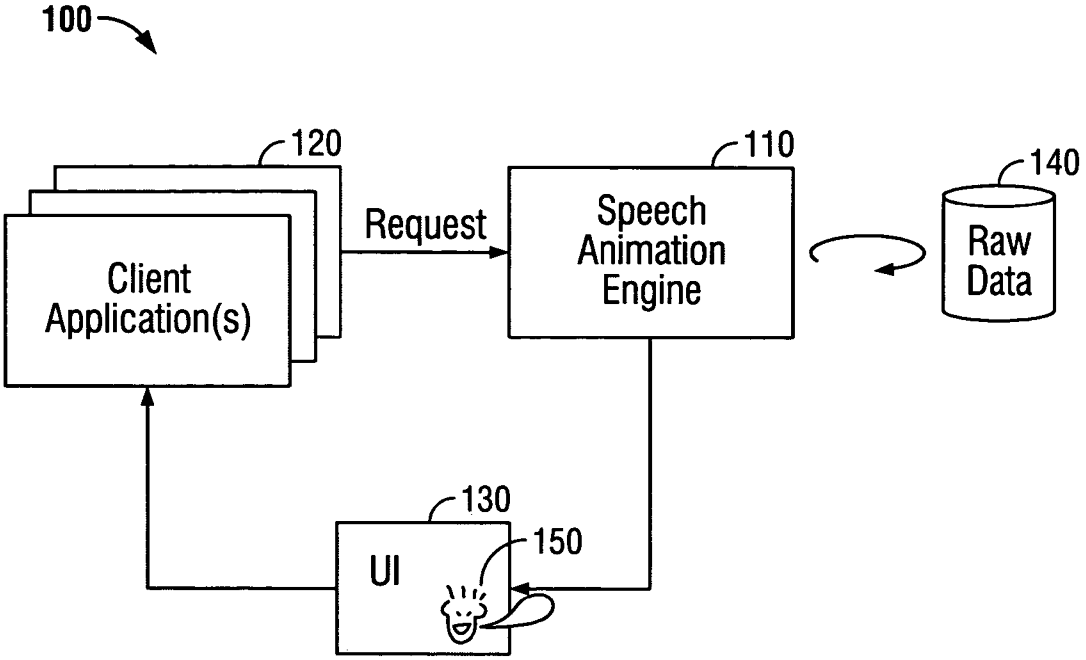
FIG. 1 is a block diagram of a system in accordance with the invention.

As shown in FIG. 1, a system 100 includes a speech animation engine 110 and one or more client applications 120. The client applications can include a variety of different application programs including, but not limited to: a personal information management application program, an application program to process a business transaction, an application program to operate a computing device, an entertainment application program, or a game. To provide for interaction with a user, the client applications 120 run on a computer having a display device for displaying visual content to the user and an audio device for providing audio content to the user.

The client applications 120 make requests to the speech animation engine 110 for code that displays or animates a talking agent 150 on the client application's user interface 130. The talking agent is represented graphically on the user interface 130 in the form of a cartoon head, animal or some other graphical icon. These animation requests identify the raw data 140 to be used to generate the speech animation content for the talking agent 150.

Figure 2:
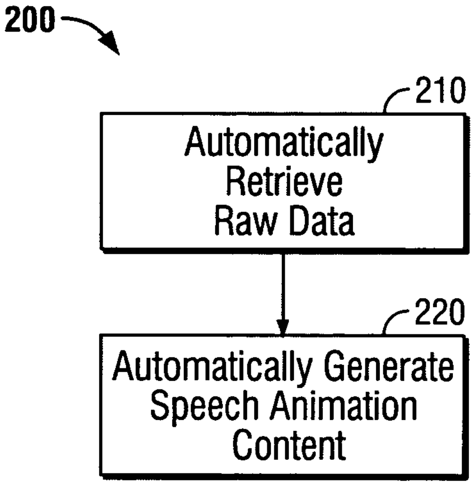
FIG. 2 is a flow diagram of a method in accordance with the invention.

In response to such animation requests, as shown by method 200 of FIG. 2, the speech animation engine 110 retrieves the raw data (step 210) and generates speech animation content based on the raw data (step 220). The raw data 140 is stored in a location accessible by the speech animation engine. The speech animation engine 110 performs the retrieval and generation steps automatically, that is, without user intervention. In addition, the retrieval and generation steps can occur in real time, as requests are made, as opposed to occurring in advance of the requests.

Figure 3:
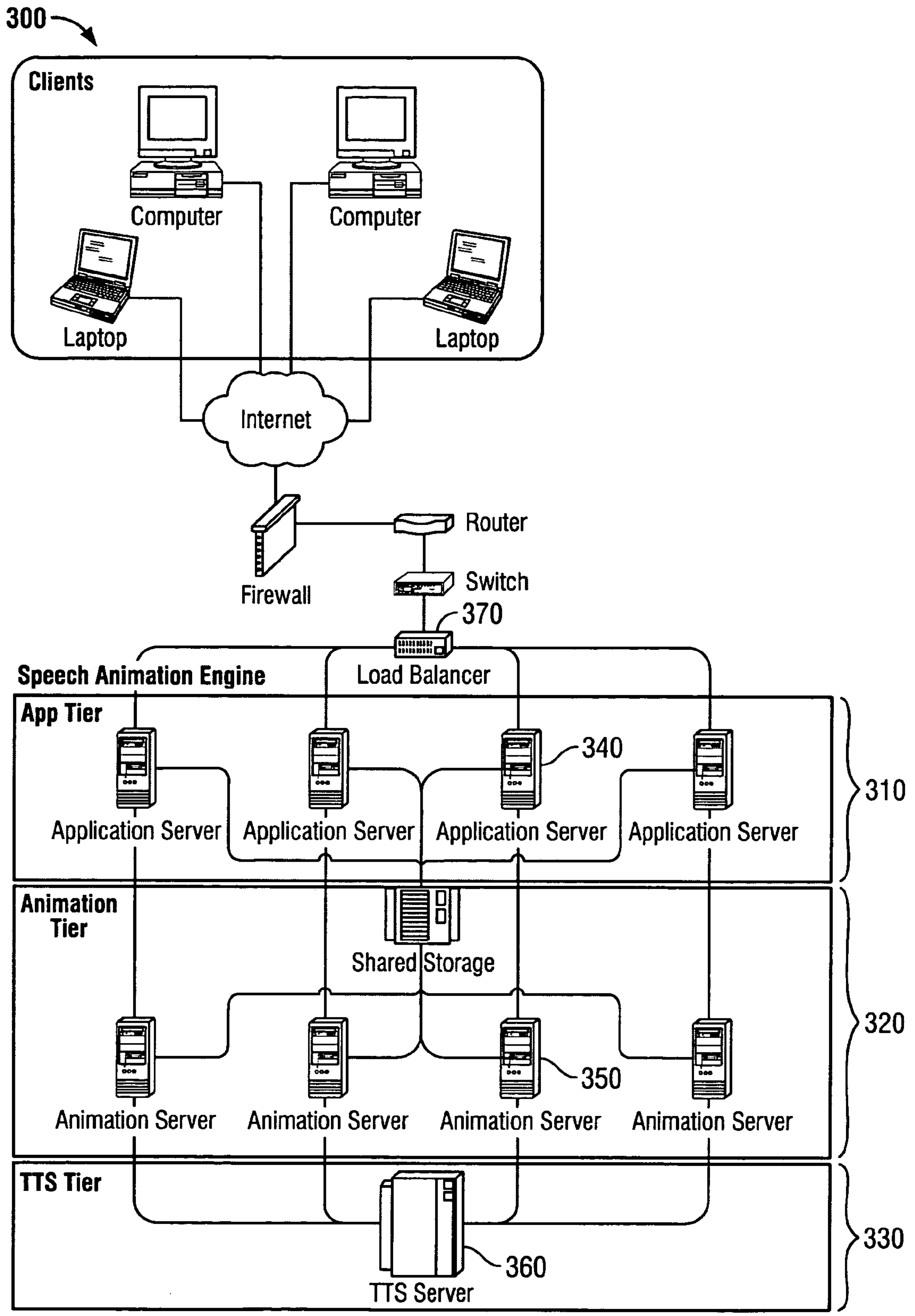
FIGS. 3 and 4 are block diagrams of one implementation of the system where the system includes an application tier.
Figure 4:
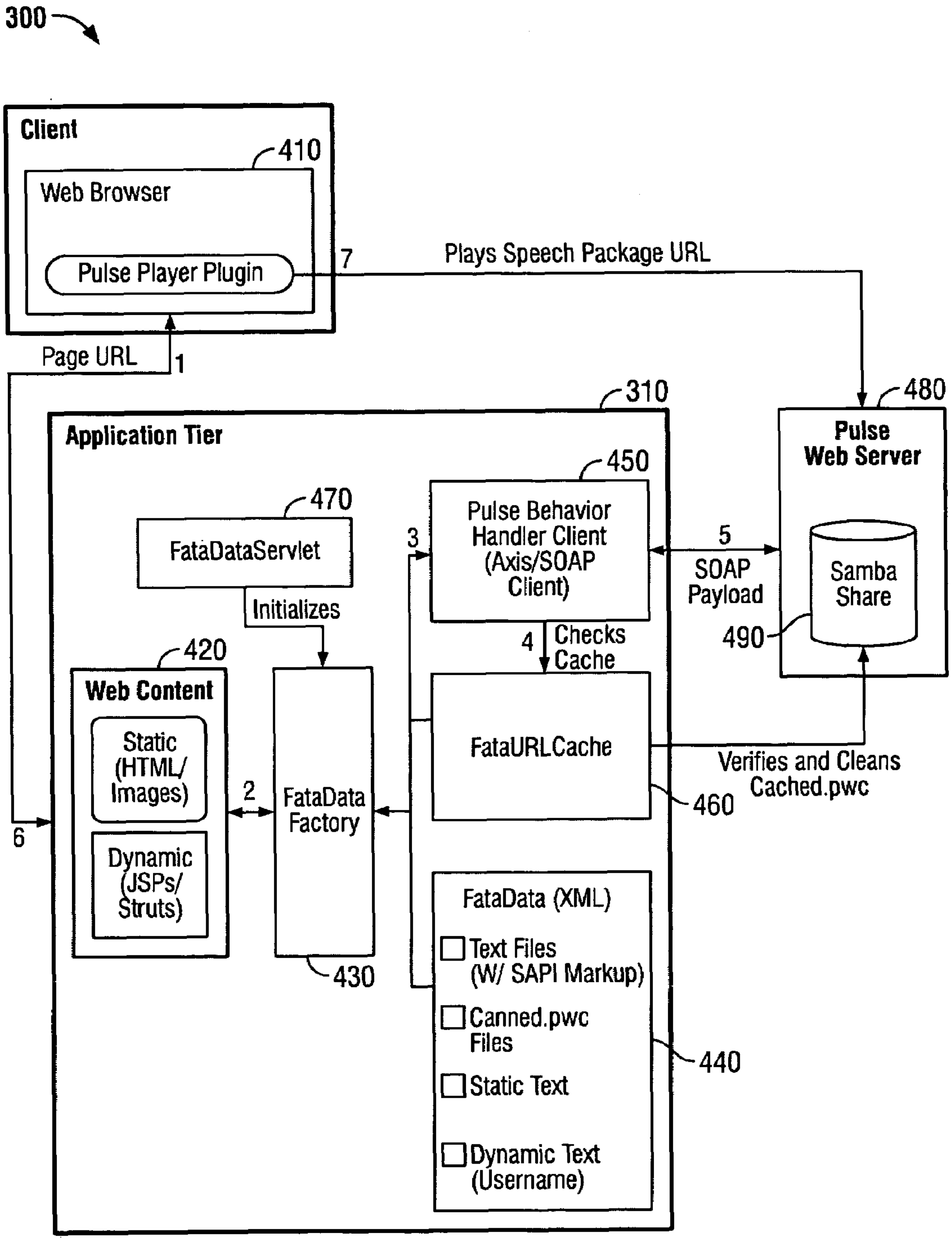

FIGS. 3 and 4 illustrate one implementation 300 of the system 100. In this implementation 300, the speech animation engine 110 includes an application tier 310, an animation tier 320 and a text-to-speech (TTS) tier 330.

The application tier 310 includes one or more application servers 340, for example, Tomcat servers. The application servers 340 have access to the raw data 140 identified in the animation requests. The raw data is retrieved using a connectivity technology such as JDBC (Java Database Connectivity), a technique for connecting programs written in Java to a variety of different databases.

The animation tier 320 includes one or more animation servers 350. The animation servers are operable to convert audio data generated by the TTS tier into speech animation content. The generated speech animation content is saved to a web-based file share or other storage mechanism that is accessible by the client applications 120. The animation servers 350 can be implemented using a variety of different speech animation technologies including Crazy Talk by Reallusion or Pulse Server by Pulse. The Pulse server is an Apache web server module that is initialized and made available by an Apache web server. Speech animation content generated by Pulse is represented in pwc format.

The TTS tier 330 includes one or more TTS servers 360. The TTS servers 360 are operable to convert textual data to audio (speech) data. The text data can be represented in a variety of text-to-speech markup formats including the Microsoft Speech Application Programming Interface (SAPI) 5.1 format. Text markup will be described in more detail below. The audio data can be represented in a variety of formats including the wav format. Data is exchanged between the TTS tier 330 and the animation tier 320 using a connectivity technology such as SAPInet Server by Pulse.

To improve system performance, more than one server can be deployed in a given tier. When multiple servers are deployed, a load balancer 370 can be used to manage distribution of workload. It is not necessary to have a one-to-one relationship between the servers in the different tiers.

Optionally, a caching mechanism is employed to improve system performance. Caching will be discussed in more detail below with reference to the FataURLCache.

In this implementation 300, as shown in FIG. 4, the client application 120 is a web-based application whose interface is rendered in a web browser 410. The web browser 410 must be able to render the animation. If this functionality is not already built into the web browser, the browser can be extended by installing a browser plug-in.

The application tier 310 includes a web content subsystem 420 that is accessible to the web browser 410. The web content includes static content, such as HTML (Hypertext Markup Language) text and images, and dynamic content, such as JSP (JavaServer Pages) code. The JSP code invokes services provided by the FataDataFactory 430, another subsystem of the application tier 310. These services include services that display and animate the talking agent 150 on the client's user interface.

The FataDataFactory subsystem 430 is the single point of entry for all animation requests from client applications 120. The FataDataFactory subsystem manages and provides access to FataData 440, raw data that is used by the system to generate the speech animation content. All or portions of the FataData can be represented in XML (extensible Markup Language) format. XML will be discussed below with reference to FIGS. 6A and 6B. The FataDataFactory subsystem 430 also provides access to external data sources such as databases that reside outside the system.

A PulseBehaviorHandlerClient subsystem 450 is responsible for conveying the animation requests to the Pulse server on the animation tier 320. The PulseBehaviorHandlerClient subsystem 450 first converts the animation requests into SOAP payloads, and then sends the requests to a dispatcher component of the Pulse server.

A FataURLCache subsystem 460 manages a cache on the shared-storage. The cache includes speech animation content as well as mappings between FataData objects and the speech animation content. The FataURLCache subsystem 460 checks each animation request against the cache first, speeding up responses if an identical animation request has previously been made. The FataURLCache subsystem 460 is responsible for removing content from the cache when the cache is full or when the content is no longer accessible.

System Initialization and Operation

To use the system 300, a client application 120 first instantiates the FataDataFactory 430 and the FataURLCache 460. The FataDataFactory 430 will then load all of the FataData 440. The FataData 440 is loaded dynamically during run time rather than in advance to ensure that the most up-to-date version of the FataData 440 is loaded.

As illustrated, the system 300 can provide a servlet program 470 that initializes the FataDataFactory 430, the FataURLCache 460 and the FataData 440. The servlet 470 also registers the FataDataFactory with the current servlet context, so that the client application 120 may have access to the services provided by the FataDataFactory. The servlet 470 is also responsible for destroying these subsystems and loaded resources during system shutdown.

Figure 5:
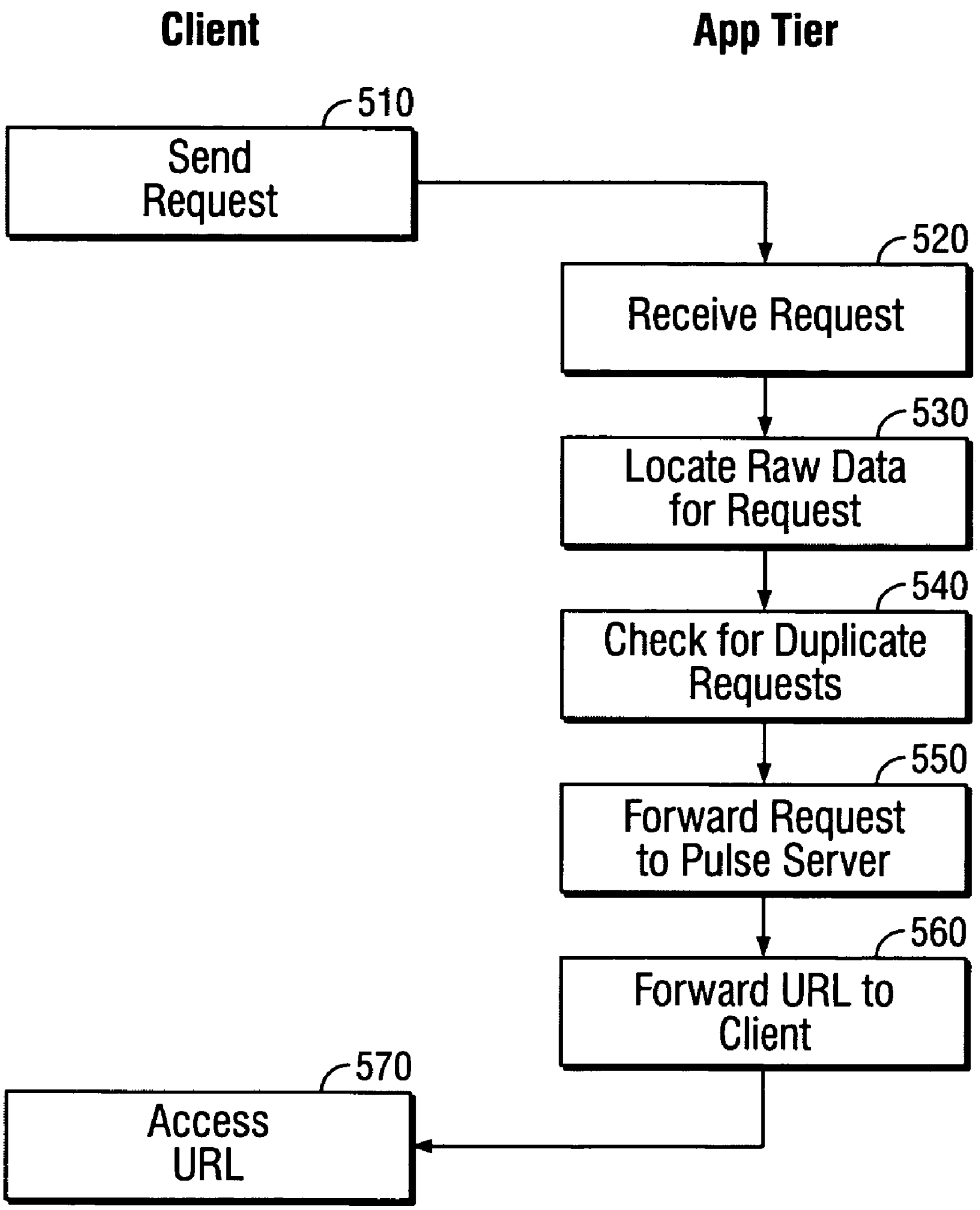
FIG. 5 is a flow diagram of data flow within the application tier.

After system initialization is complete, the system 300 is ready to process client requests. As shown by method 500 of FIG. 5, a typical request-response cycle begins when the client application 120 sends an HTTP (Hypertext Transfer Protocol) request to the system through the web content subsystem (step 510). The HTTP request can be a request to load a talking agent or a request to animate an already loaded talking agent. The request to load a talking agent includes a parameter that identifies the talking agent 150 to be loaded. The request to animate a talking agent includes a parameter that identifies the raw data 140 to be used to generate the speech animation content.

The request is received by the FataDataFactory (step 520). The FataDataFactory locates all the FataData needed to complete the request (step 530). For example, the FataDataFactory 430 can match the request parameters against a map or table of all the FataData. The FataDataFactory 430 then converts the request into a format compatible with the PulseBehaviorHandlerClient 450 and forwards the request to the PulseBehaviorHandlerClient 450. The PulseBehaviorHandlerClient 450 sends the request to the Pulse server 480 as a SOAP payload (step 550). Prior to sending the request to the Pulse server 480, the PulseBehaviorHandlerClient 450 checks the FataURLCache to see if the request is identical to any of the cached requests (step 540). If it is, then the PulseBehaviorHandlerClient 450 does not need to send the request to the Pulse server 480. If it is not, then the request is sent to the Pulse server 480.

Upon receiving the request, the Pulse server 480 generates the requested speech animation content and saves it to the shared-storage 490. The system then returns the URL of the speech animation content to the client (step 560), which uses the URL to access the content (step 570).

The above-described data flow is just an example. Other variations are possible. For example, instead of the PulseBehaviorHandlerClient 450 checking the cache, the FataDataFactory 430 can perform this check.

Additional Features

The following paragraphs describe additional features that can be incorporated into the above-described systems and methods.

Event-Driven Communication

In an event-driven or push implementation, after the main content has already been delivered to the client, the system maintains an open connection to the client so that it can continue to push additional content to the client after the main content has already been delivered and rendered. Whenever the system needs to change the content, it can deliver client-side scripts and Dynamic HTML (DHTML) to make the change. Pushlets offer one framework for pushing events to a web-based client, although other frameworks may be used.

Alternatively, a polling mechanism may be used instead of push to eliminate the need for a constant connection between the client and the system. With polling, the system may need to include data structures for storing the state of the client after an initial request and then restoring the state of the client for a subsequent request.

Custom Tags

To make it easier for client applications 120 to interface with and make use of the speech animation system, the system can provide a set of custom scripting tags that developers of client applications can incorporate into the user interface code for the client applications. These tags expand into code that sends the animation requests to the speech animation system. The tags include a renderTalkingAgentJS tag, a renderFataJS tag and a renderRawJS tag.

renderTalkingAgentJS Tag

This tag generates the code to set up and display the talking agent 150 as part of the user interface 130 for the client application 120. The only required parameter for this tag is the address or URL (uniform resource locator) of the talking agent file. Optional parameters include the width, height, and background color of the talking agent.

The following JSP(JavaServer Pages) code fragment illustrates use of this tag: <renderTalkingAgentJS path="/TalkingAgents/bob/bob.pwr" width="160" height="210" bgColor="bcbdc2"/>. This code renders a JavaScript function call that sets up the talking agent "/TalkingAgents/bob/bob.pwr" with width of 160 pixels and height of 210 pixels using a background color of "bcbdc2" (a grayish color).

renderFataJS Tag

This tag generates the code that animates the talking agent 150 and causes it to speak. Only one parameter is required for this file: a name parameter that identifies the name of the speech animation file to be used for the talking agent.

The following JSP code fragment illustrates use of this tag: <renderFataJS name="RES-greeting"/>. This code renders a JavaScript function call that causes the talking agent to speak and behave according to the contents of the FataData named "RES-greeting".

renderRawJS Tag

This tag is used as an alternative to the renderFataJS tag. This tag allows speech animation data to be specified explicitly. Two parameters are used for this tag: A text parameter that specifies the text to be spoken and a voice parameter that identifies which voice to speak in. Optional parameters include the emotion (e.g., happy, unhappy, neutral), look (e.g., up, down, right, left), and expression (e.g., angry, confused, grin).

The following JSP code fragment illustrates use of this tag: <renderRawJS voice="Mary" text="Hello hot-stuff." emotion="happy" expression="wink"/>. This renders a JavaScript function call that causes the talking agent 150 to speak and animate the text "Hello hot-stuff" with the emotion "happy" and the expression "wink" using the voice "Mary".

XML Format

FIGS. 6A and 6B illustrate how the FataData 440 can be structured in XML. FIG. 6A shows an example XML schema and FIG. 6B shows an implementation of this example schema.

In FIG. 6A, the symbol (*) indicates required attributes. As illustrated, each <talking-head-data> element 610 has a required name (or alias), voice, and speech file. The remaining attributes (emotion, expression, and look) are optional.

Each <speech-files> element 620 typically has only one attribute, the type, which may be one of two values: "set", or "pool". A set means that the set of <speech-data> elements associated with the <speech-files> element should be played in sequence. A pool indicates that a single <speech-data> element should be chosen randomly from the set. The pool can be used to define a pool of synonyms. Synonyms are equivalent content that can be used interchangeably. The use of synonyms enables the speech content to be variable. This makes the talking agent appear more socially intelligent to a user.

Each <speech-data> element 630 contains the type and content of the raw data that is to be turned into speech by the TTS server. The content of this data depends heavily on the type. Special types of note are:

'talking-head-data'—a pointer to another talking-head-data alias in the XML;

'textFile'—a reference to an external text file containing the text to speak;

'pwcFile'—a reference to a pre-generated speech animation file in pwc format (the format used by the Pulse server);

'static'—raw text defined directly in the XML;

'fataData'—-dynamic data to be replaced based on the 'value'.

FIG. 6B illustrates an example of how the schema defined in FIG. 6A could be used to define an instance of the FataData 440. In this example, the XML code defines a FataData instance that is an animated greeting. The content of the animated greeting is randomly selected from a pool of synonymous content including:

a reference to content defined in another FataData instance 640;

content to be dynamically generated based on some static text 650;

content to be dynamically generated based on text stored in an external text file 660;

pre-generated content 670;

and a dynamic content field to be replaced by the user's name 680. Dynamic content will be discussed in more detail below.

Text Markup

The text included in the FataData 440 can include markup tags including TTS markup tags and custom markup tags.

TTS Markup

TTS markup tags define prosodic, pronunciation, intonation or inflection settings for the speech. The TTS markup tags can be implemented in a variety of text-to-speech markup formats including the Microsoft Speech Application Programming Interface (SAPI) 5.1 format and the VoiceXML format. The TTS markup is preserved by the application server and passed to the animation server, which in turn passes it to the TTS server.

Dynamic Text Templates

Custom markup tags are used to insert dynamic elements into the text to produce a dynamic text template. Custom markup tags can be implemented in a variety of text markup formats including XML. Custom markup tags are expanded by the application server before being passed to the animation server.

The expansion process involves filling in or supplying a value for the dynamic elements. The supplied value can come from the current application session. This is further illustrated by the dynamic text template shown in FIG. 7A. This template includes some static text elements 710 as well as a dynamic element 720. The value of "ProductName" will differ depending on which product the user has selected. FIG. 7C shows the resulting expanded text when the product "Grand Doohickey" has been selected.

An alternative method to create a dynamic text template is using the speech sets described above with respect to FIG. 6. FIG. 7B illustrates use of speech sets to create a dynamic template that is equivalent in content to the one shown in FIG. 7A.

While equivalent in content, the two types of dynamic templates may not necessarily be equivalent in performance because the system may process the two types differently. Speech sets are typically processed as segments that are then spoken in series to form the whole speech set. By contrast, when using custom markup, the entire text is typically expanded and processed as a whole.

Thus, one advantage of using custom markup is that there will be little or no pause between segments for loading speech files and the speech will not have unnatural breaks in the middle of sentences due to the segmentation of the text.

At the same time, one advantage of using speech sets is that the response time is typically faster than using custom markup. Segments without dynamic elements can be cached and re-used repeatedly without having to be processed again. Caching also helps to reduce or eliminate the pause between speech segments.

Behavioral Contexts

As described herein, a speech animation engine generates speech animation content that drives the expressions and behaviors of talking agents displayed by speech animation clients. The speech animation engine includes one or more servers and will henceforth be referred to as a speech animation server.

Figure 8:
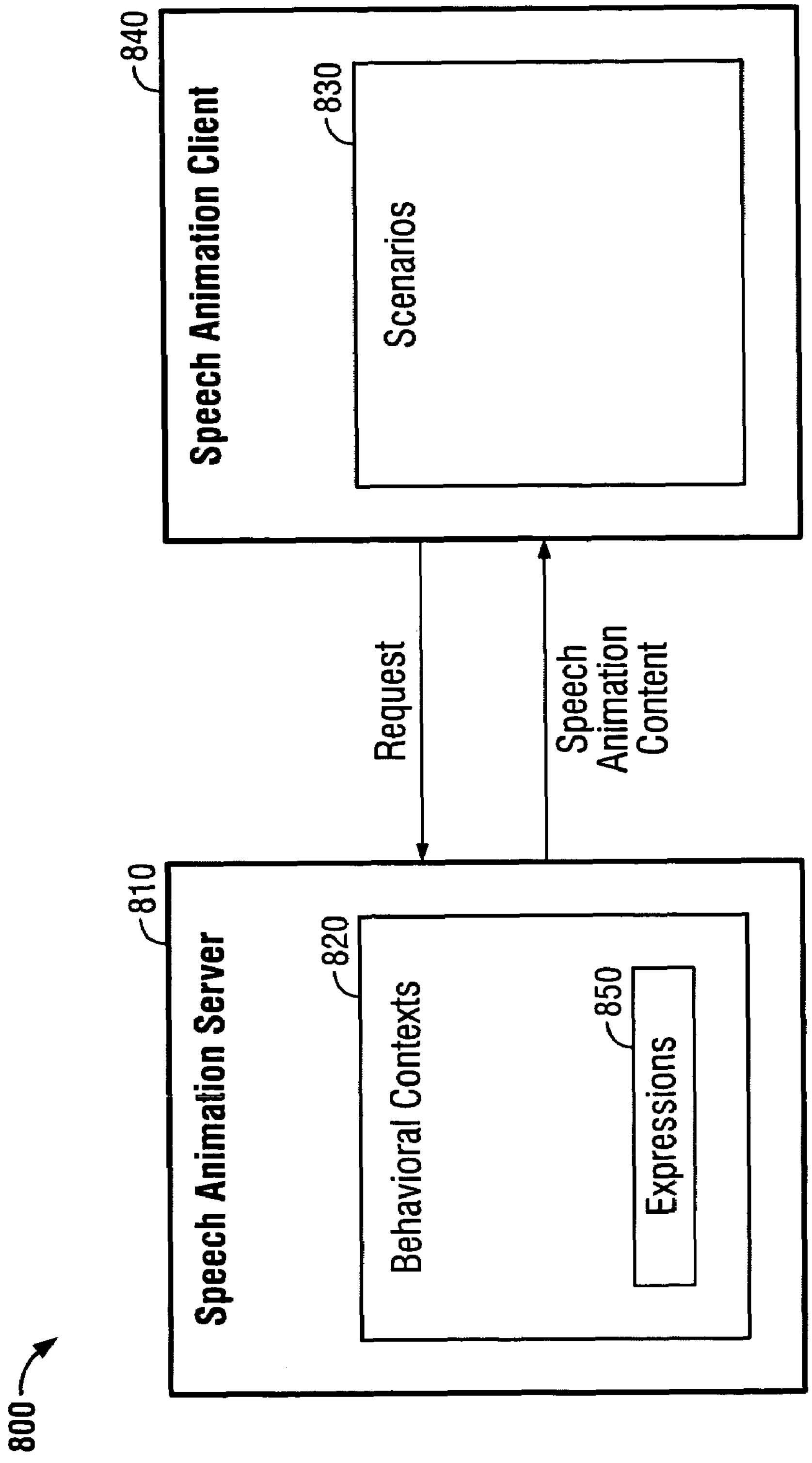
FIG. 8 is a block diagram of a system that uses behavioral contexts.

As shown in FIG. 8, in one implementation of such a server 810, a developer or programmer defines a set of behavioral contexts 820 that are maintained by the server 810. The behavioral contexts 820 correspond to particular scenarios 830 that may occur during execution by the speech animation clients 840. For example, for a web commerce client, one such scenario could be an "upcoming purchase" scenario that is triggered when a user of the web commerce application puts an item in a shopping cart.

For each behavioral context 820, the developer defines a set of behaviors 850 that are appropriate to the scenario of the behavioral context. For example, for the "upcoming purchase" context, such behaviors could include a smile that is broader than usual and a voice that is louder and higher in pitch than usual.

The developer then includes references to the behavioral context in the raw data used by the server 810 to generate the speech animation content. The server automatically incorporates the behaviors 850 of any referenced behavioral contexts 820 into the generated speech animation content, as if those behaviors 850 had been defined explicitly in the raw data itself.

The raw data may include several different data items, each intended for a different scenario. For example, there may be a first data item that defines speech to be spoken when the user selects an item from his wish list. There may be a second data item that defines speech to be spoken when the user selects an item from the product catalog. The speech defined in first data item may differ from the speech defined in the second data item because the scenarios are different. Nevertheless, there may be some speech or non-speech behaviors that are common to both scenarios. For example, in both scenarios, it may be desirable for the talking agent to have a broader smile and a louder voice. This common behavior can be defined in a behavioral context (e.g., the upcoming purchase context), and this context can be associated with each of the data items by reference. In this manner, the behavioral contexts mechanism makes it easy for developers to apply this common behavior to both scenarios. Without the behavioral contexts mechanism, the developer would need to define the common behavior explicitly in each data item.

On the client side, the client application includes code that makes requests to the server 810 for animation content. The animation requests identify the raw data to be used to generate the animation content. The identified raw data can include references to one or more behavioral contexts defined and maintained by the server.

These behavioral contexts can be used by client applications to display talking agents that exhibit socially intelligent behavior. The client application can automatically detect and diagnose the nature of a particular human-computer interaction. The client application can then use this diagnosis to request animation content that is specific to the particular human-computer interaction. For example, the client application may detect an upcoming purchase. In response, the client application makes an animation request to the server, and in this request, the client application identifies raw data that references the upcoming purchase context described above. In this manner, behavioral contexts is a mechanism that enables talking agents to be more responsive to particular human-computer interactions, thereby allowing the talking agent to appear more socially intelligent to users.

The following paragraph describes a data model for implementing behavioral contexts. As described above with respect to FIGS. 6A and 6B, the raw data 140 can be represented in XML format. In such an implementation, the behavioral context references can be represented as XML attributes. For example, FIG. 9 shows an XML document 900 that includes two raw data instances 910, 920. Each raw data instance 910, 920 contains an attribute "behavioralcontext" 930 that specifies the name of a particular behavioral context 820. In this example, both raw data instances 910, 920 correspond to a greeting of some kind, so they both refer to the same behavioral context, "greeting". The definition 940 for this behavioral context is also included in the XML document 900. In this example, the behavioral context "greeting" has been defined to include two behaviors 950 "nod" and "smile".

Adaptive Content

In one implementation, the generated speech animation content is customized for a particular client application or user of the client application. In such cases, the request from the client further includes context information. The context information can be information about the particular application session (e.g., how long the session has been active) or information about a particular user of the application, for example, his personal characteristics (such as name, age, gender, ethnicity or national origin information, and preferred language) or his professional characteristics about the user (such as occupation, position of employment, and one or more affiliated organizations).

The invention can be implemented in digital electronic circuitry, or in computer hardware, firmware, software, or in combinations of them. The invention can be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The invention can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the invention, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The invention has been described in terms of particular implementations. Other implementations are within the scope of the following claims. For example, the steps of the invention can be performed in a different order and still achieve desirable results.

What is claimed is:

1. A computer program product, tangibly embodied in an information carrier, the computer program product being operable to cause data processing apparatus to perform operations comprising:

receiving a first request from a client application for first speech animation, the first request identifying data to be used to generate the first speech animation, wherein the identified data includes a tag having a parameter corresponding to a desired emotion and a reference to an application scenario of the requesting client application, the application scenario corresponding to a behavioral context that includes a set of expressions that are appropriate to the particular application scenario;

determining which application scenario prompted the first request based on other data information included in the first request;

retrieving the data and the set of expressions in the behavioral context;

generating the first speech animation based on the parameter and using the retrieved data and the set of expressions in the behavioral context; and sending a response identifying the generated first speech animation to the client application.

2. The product of claim 1, wherein retrieving the data includes retrieving the data in real time.

3. The product of claim 1, wherein the data specifies text to be used to generate the first speech animation.

4. The product of claim 3, wherein the text includes variable elements.

5. The product of claim 1, wherein the data specifies a voice to be used to generate the first speech animation.

6. The product of claim 1, wherein the data specifies a pool of synonyms; and generating the first speech animation includes selecting a synonym from the pool of synonyms.

7. The product of claim 1, wherein the first request further identifies context information taken from a live session of the client application; and generating the first speech animation includes incorporating the context information into the generated first speech animation.

8. The product of claim 7, wherein the context information includes information about a user of the client application.

9. The product of claim 1, wherein:

the client application is a web application; and the first request is an HTTP request.

10. The product of claim 1, further comprising:

receiving a second request from the client application for a second speech animation, the second request identifying data to be used to generate the second speech animation, wherein the data identified in the second request is different from the data identified in the first request, but contains a reference to the same behavioral context referenced by the data identified in the first request; and generating the second speech animation using the identified data and the same set of expressions used to generate the first speech animation.

11. A system, comprising:

a speech animation server; and a client application in communication with the speech animation server, wherein the client application is operable to perform the following operations:

sending a request for speech animation to the speech animation server, the request identifying data to be used to generate the speech animation, the speech animation being speech synchronized with facial expressions;

receiving a response from the speech animation engine, the response identifying the generated speech animation; and using the generated speech animation to animate a talking agent displayed on a user interface of the client application;

and wherein the speech animation server is operable to perform the following operations:

receiving the request for speech animation from the client application;

retrieving the data identified in the request, wherein the retrieved data includes a tag having a parameter corresponding to a desired emotion and a reference to an application scenario of the requesting client application, the application scenario corresponding to a behavioral context that includes a set of expressions that are appropriate to the particular application scenario;

determining which application scenario prompted the request based on other data information included in the first request;

generating the speech animation based on the parameter using the retrieved data and further using the set of expressions defined in the behavioral context; and sending the response identifying the generated speech animation to the client application.

12. The system of claim 11, wherein retrieving the data includes retrieving the data in real time.

13. The system of claim 11, wherein the data specifies text to be used to generate the speech animation.

14. The system of claim 13, wherein the text includes variable elements.

15. The system of claim 11, wherein the data specifies a voice to be used to generate the speech animation.

16. The system of claim 11, wherein the data specifies a pool of synonyms; and generating the speech animation includes selecting a synonym from the pool of synonyms.

17. The system of claim 11, wherein the request further identifies context information taken from a live session of the client application; and generating the speech animation includes incorporating the context information into the generated speech animation.

18. The system of claim 17, wherein the context information includes information about a user of the client application.

19. The system of claim 11, wherein:

the client application is a web application; and the request is an HTTP request.

20. A method of generating a speech animation comprising:

receiving a request from a client application for a speech animation;

identifying data to be used to generate the speech animation in the request, the data including a tag indicating a desired emotion and a reference to an application scenario of the requesting client application;

assigning a behavioral context to the application scenario, the behavioral context including a set of expressions that are appropriate to the application scenario, wherein the reference of the data indicates the behavioral context;

determining which application scenario prompted the request based on other data information included in the request; and generating the speech animation based on the tag and the reference.

* * * * *

UNITED STATES PATENT AND TRADEMARK OFFICE

CERTIFICATE OF CORRECTION

PATENT NO. : 7,599,838 B2
APPLICATION NO. : 10/932411
DATED : October 6, 2009
INVENTOR(S) : Gong et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1211 days.

Signed and Sealed this

Twenty-eighth Day of September, 2010

David J. Kappos
*Director of the United States Patent and Trademark Office*